Sept. 3, 1968   G. F. KRTOUS ET AL   3,399,845
TAKE-UP REEL HAVING VARIABLY TORQUED SPROCKET RING
Filed Nov. 10, 1966   2 Sheets-Sheet 1
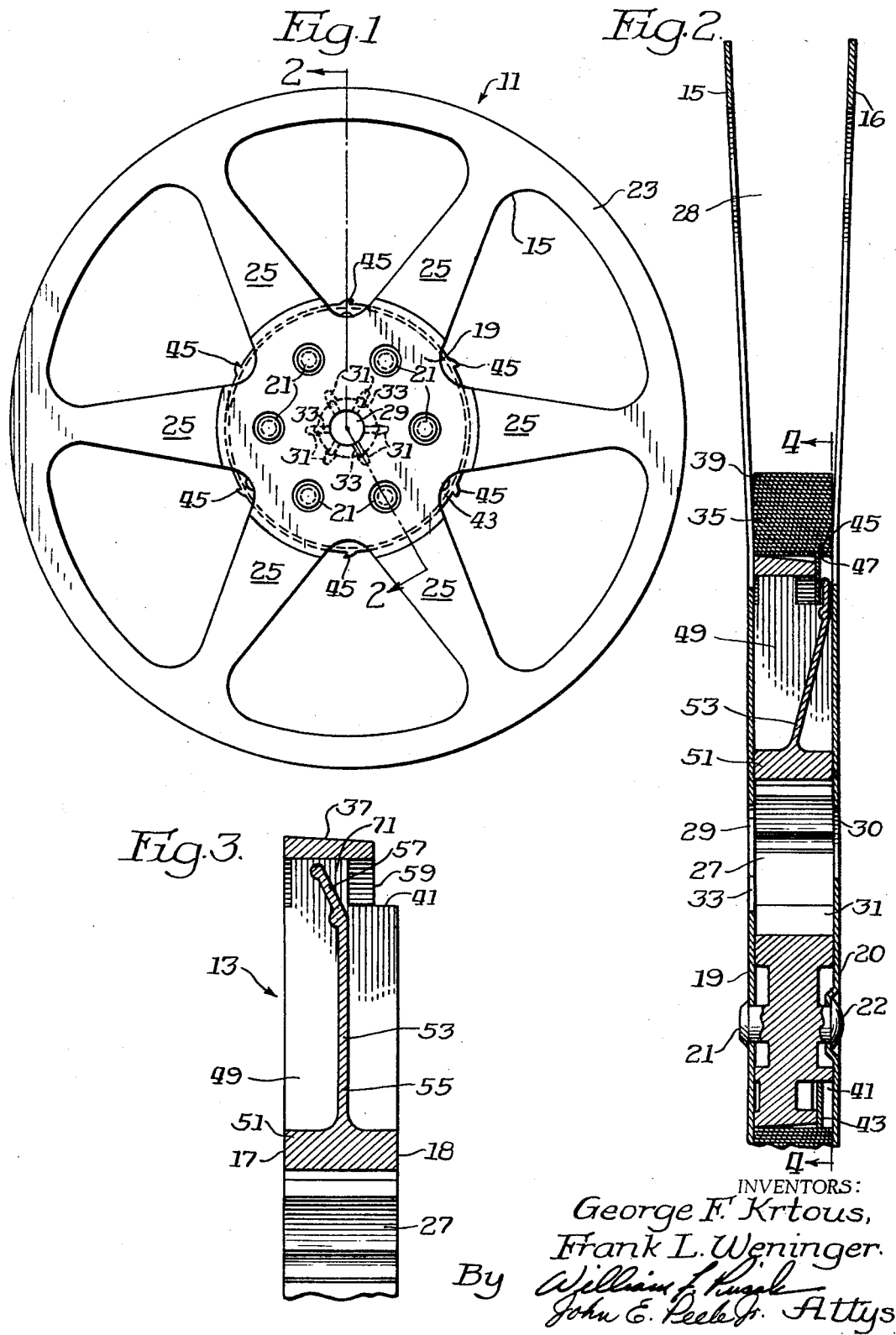
INVENTORS:
George F. Krtous,
Frank L. Weninger.
By William L. Kunzl
John E. Peele Jr. Attys Sept. 3, 1968  G. F. KRTOUS ET AL  3,399,845
TAKE-UP REEL HAVING VARIABLY TORQUED SPROCKET RING
Filed Nov. 10, 1966  2 Sheets-Sheet 2
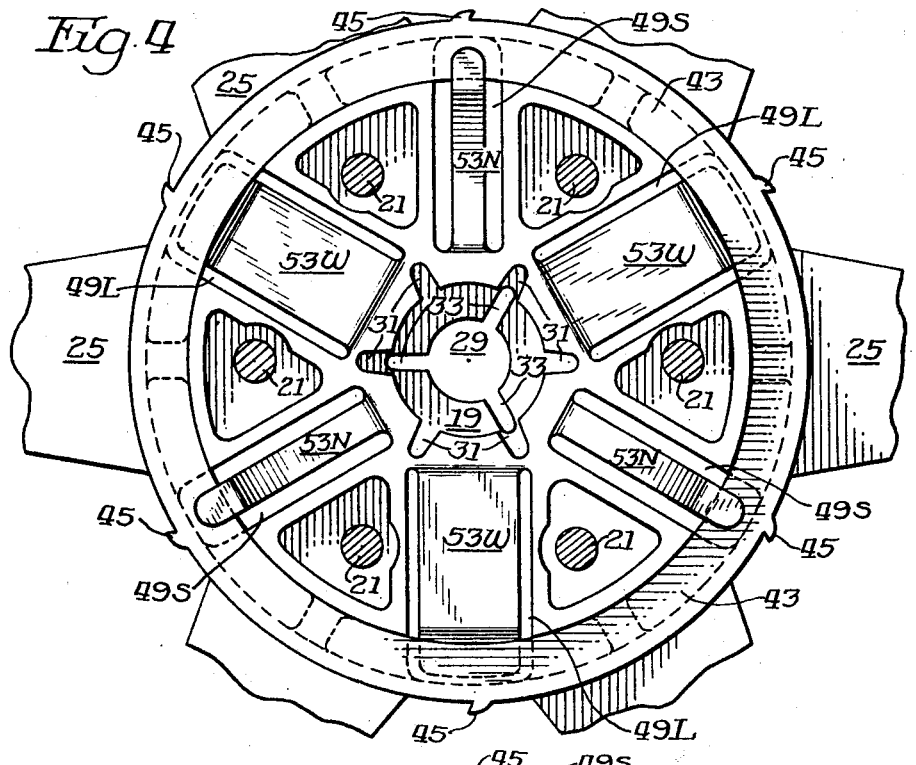
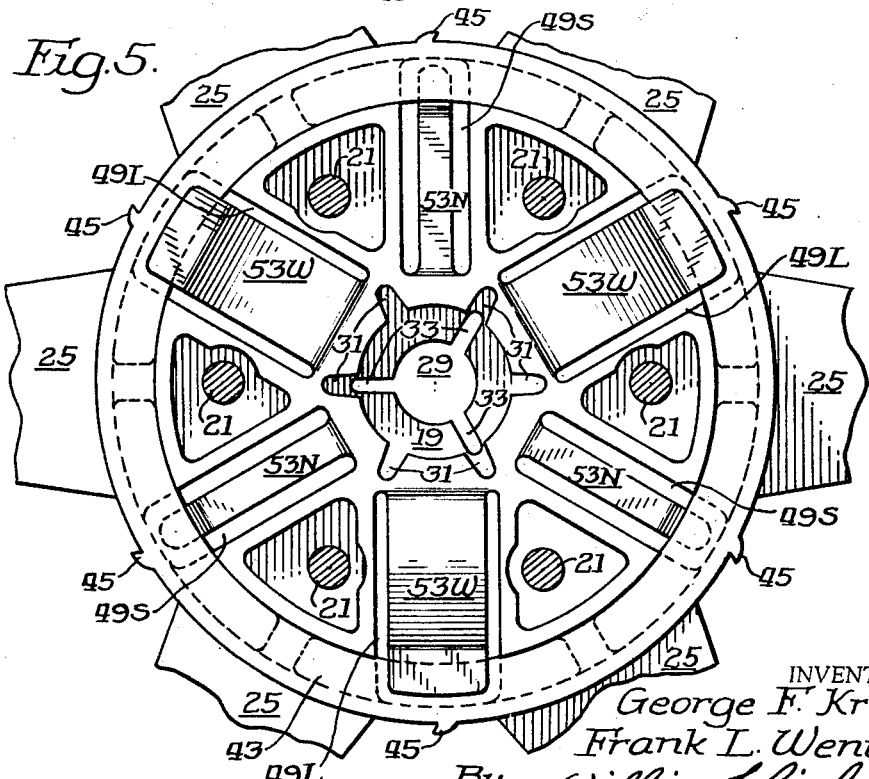
INVENTORS:
George F. Krtous,
Frank L. Weninger.
By William F. Pinckle
John E. Peele Jr. Attys United States Patent Office 3,399,845
Patented Sept. 3, 1968

3,399,845
TAKE-UP REEL HAVING VARIABLY
TORQUED SPROCKET RING
George F. Krtous and Frank L. Weninger, Chicago, Ill.,
assignors to Bell & Howell Company, Chicago, Ill., a
corporation of Illinois
Filed Nov. 10, 1966, Ser. No. 593,396
4 Claims. (Cl. 242—74)

ABSTRACT OF THE DISCLOSURE

Disclosed is a rotatable web handling take-up reel having flanges extending from the reel hub to form a web chamber. A sprocket ring having web engaging teeth surrounds the hub and is held in slippable frictional engagement and for rotation relative the hub by a plurality of elongated holding means formed integral with the hub at one end, and yieldably engaging the sprocket ring at the other end with sufficient torque to cause slippable co-rotation of the ring with the hub. The elongated holding means are selectively usable and are arranged in sets having different yieldability characteristics so that a range of torques may be applied to the ring.

---

The present invention relates to reels for handling elongated webs.

Particularly the invention relates to a take-up reel assembly for webs of the type exemplified by motion picture film and record tape.

Conventionally a take-up reel assembly of the class indicated comprises a hub adapted to be rotationally driven to coil thereabout a web drawn or fed from a supply source. A pair of axially spaced flanges which extend radially from the periphery of the hub define a web chamber in which a coil is accumulated during web take-up. To the end that the initial convolution of a web is gripped for formation of a coil about a hub, a sprocket ring is conventionally provided.

A conventional sprocket ring has circumferential teeth which extend radially slightly beyond the periphery of its hub, and the sprocket ring is arranged for co-rotation with its hub. The teeth of the sprocket ring are adapted to engage in notches of a first convolution of a web thereby to form a coil about a driven hub.

An enlarging web coil builds torque which is impressed on its hub in an opposite angular direction to the drive torque of such hub. If the magnitude of the coil-impressed torque exceeds the magnitude of the drive torque, the hub will stall and produce attendant undesirable effects. Therefore, conventionally, a sprocket ring is held in releasable association with its hub for slippage co-rotation therewith. Thereby, excessive web-generated torque may be relieved. To the latter end, a metal wave washer with an annular undulant profile is arranged adjacent the sprocket ring for impingement thereof against the hub under a fixed torque load determined by wave washer characteristics.

Conventionally, wave washers are of standard configuration, each being adapted to impose a torque like the others. Accordingly, maximum utility of a reel is limited to conditions which indicate torque characteristics in a sprocket ring corresponding to those imparted by its wave washer. However, diverse web handling devices on which a take-up reel is used impart varied torque characteristics to a web as it is being wound on such reel. Such varied characteristics require corresponding or compensating torque load in a sprocket ring for efficient web take-up. No prior device is adapted to provide holding means of variable torque for co-rotational securance of a take-up hub and its sprocket ring.

It is an object of the present invention to provide a take-up reel construction having a web take-up mechanism of variable take-up torque characteristics.

It is another object of the invention that said take-up mechanism comprise a drivable hub and a sprocket arranged for slippable frictional co-rotation with said hub under variable torque loads.

It is a further object of the invention to provide in said take-up mechanism adjustable means for generating a variable torque impressed on said take-up sprocket to selectively vary the magnitude of the co-rotational frictional force between the hub and the sprocket.

The foregoing and other objects, features and advantages of the present invention will become more apparent upon consideration of the following description and appended claims when considered in conjunction with the accompanying drawings wherein the same reference character or numeral refers to like or corresponding parts throughout the several views.

On the drawings:

FIG. 1 is a side elevational view of a take-up reel embodying the present invention.

FIG. 2 is an enlarged planar projection of the transverse sections taken substantially on the broken line 2—2 of FIG. 1 and looking in the direction of the arrows.

FIG. 3 is a sectional view of a portion of the hub of said reel, such view being similar to that of a like portion of the hub shown in FIG. 2 except said hub being shown disassembled from said reel.

FIG. 4 is a sectional view taken substantially on the line 4—4 of FIG. 2 and looking in the direction of the arrows, one torque condition imposed on the sprocket ring being illustrated.

FIG. 5 is a view similar to FIG. 4, however showing another torque condition imposed upon said sprocket ring.

Referring now more particularly to FIG. 1, there is seen a take-up reel generally designated 11. The reel 11 comprises a hub generally designated 13 and a pair of axially spaced apart normally inner and outer reel flanges 15 and 16 (FIG. 2). Said hub has opposite axially spaced apart normally outer and inner flats or sides 17 and 18 against which flat central mounting plates or bosses 19 and 20 of said flanges are secured, respectively, by means of fasteners such as rivets 21 (FIG. 2). In the present embodiment, said rivets are fashioned integrally with the hub as plugs or studs which project outwardly from sides 17 and 18. Said rivets are adapted for passage through openings in the mounting plates 19 and 20, the ends of said rivets being suited for flattening into flange retaining heads 22 (FIG. 2).

A circular rim 23 peripherally defines each of the reel flanges and is connected to a respective central plate by means of a plurality of integral radial spokes 25. The foregoing construction defines a web chamber 28 between said flanges about said hub.

The hub has a central spindle passage 27 which extends transversely of said flanges. A plurality (six in the present embodiment) of uniformly annular spaced keyways 31 radiate outwardly from said passage 27. Mounting plate 19 has a central hole 29, and mounting plate 20 has a central hole 30 (FIG. 2), said last mentioned holes being disposed in co-axial alignment with and at the opposite ends of said spindle passage. However, the diameters of the holes 29 and 30 are shown as being less than the diameter of said spindle passage so that said mounting plates partially overlay said spindle passage. Hole 29 has a plurality (three in the present embodiment) of radial uniformly annularly spaced keyway extensions 33 (FIG. 3).

The foregoing construction provides for easy registration of said hub and said flanges in operative association by alignment and partial registration of keyway extensions 33 with an equal number of keyways 31, as illustrated in FIGS. 4 and 5. Thusly arranged, passage 27 is adapted to accommodate a splined drive spindle (not shown), the keyway extensions 33 being proportioned to receive in driving engagement the outer ends of the splines of such drive spindle.

A web 35 (FIG. 2) is coiled about said hub in the chamber 28, with the inner convolution of said web being disposed adjacent the periphery 37 of said hub. To minimize frictional engagement between the hub and the web, said hub periphery has an annular taper, sloping centrally toward the inner hub side 18. Also, because the hub and the coiled web may rotate at different speeds, the flanges 15 and 16 may be slightly slanted outwardly from the center, as at 39, to minimize drag.

As illustrated in FIG. 2, the hub is relieved from the inner side 18 to provide an annular shoulder 41, which is concentric with passage 27, and an annular flat 59 which is parallel to hub side 18. A sprocket ring 43 is adapted for disposition about the annular shoulder in slippable frictional engagement with flat 59. Said sprocket ring has a plurality of radially extending teeth 45 which project slightly beyond the periphery of the hub. The teeth 45 are adapted to drivingly engage in notches 47 (FIG. 2) which are formed along one margin of the web. Thereby, a first convolution of a web about the hub 13 can be rotationally driven as said sprocket ring rotates to cause coiling about said hub of the downstream end portions of said web.

As illustrated in FIGS. 2-5, inclusive, the hub is provided with a plurality of uniformly annularly spaced radially extending windows generally designated 49. The windows may extend entirely through the hub, opening through both sides 17 and 18 and flat 59. Each window is defined by what might be referred to as a base 51 which represents a thickness of hub fabric which separates such window from the spindle passage 27.

A sprocket retainer or holder in the form of a spring finger generally designated 53 is fashioned integrally with each base 51. The arrangement and fabrication of parts is such, in the present embodiment, that each spring finger is inherently biased for disposition wholly within its window 49 medially of the sides 17 and 18 and projects in a general radial direction when not tensioned (FIG. 3). Each spring finger has an elongated normally erect inner section 55 and an outer integral angularly disposed sprocket engageable section 57. The inner end of each inner spring finger section 55 is immediately cojoined with its base 51.

Each spring finger 53 is adapted to be bent so that its outer section 57 will be rocked out of an associated window 49 through its opening in flat 59. The angular disposition of each outer section 57 relative to its inner section 55 is such that upon operative conditioning to the position of FIG. 2, such outer section assumes a radial aspect, whereas its inner section becomes angularly disposed.

The length of each spring finger is such that when the sprocket ring is disposed against flat 59, such finger may be neither bent out of nor returned to its window. Restated, the sprocket ring is proportioned to block an outer part of each window to limit displacement of the spring fingers. Therefore, working spring fingers are required to be moved out of respective windows before the sprocket ring is mounted against flat 59. When disposed in operative condition, the outer sections 57 of said spring fingers engage against the hub distal face of the sprocket ring to cause slippable frictional engagement of the opposite face of said sprocket ring and the hub flat 59. Spring finger tension provides the torque for holding the sprocket ring and the hub in corotational association.

For fabrication of the hub and its integral spring fingers, a Du Pont polymer commercially available under the brand "Delrin 500" has been treated according to manufacturer's directions to mold the hub and its co-fashioned parts.

In FIGS. 4 and 5, it is seen that the windows as well as the spring fingers are of varied proportions, those of like proportions being arranged in a uniformly disposed set. In the illustrated embodiment, two window variations are shown, namely, those defining a large opening and those defining a small opening. The former have been identified by appending an L to each corresponding numeral 49, whereas the latter have been identified by appending an S to each corresponding numeral 49. Also, said spring fingers are of two dimensions, one wide and the other narrow. The former are designated by appending a W to each corresponding numeral 53, and the latter being designated by appending N to each corresponding numeral 53. The narrow fingers 53N are proportioned for efficient association with the small windows 49S and when tensioned in operative position generate less torque than the wide fingers. The wide fingers 53W are proportioned for efficient association with the large windows 49L. It is observed that the invention is not limited to two variations in the sizes of the windows and spring fingers.

In FIG. 4, the sprocket ring is shown held in assembled slippable corrotational relationship with the hub by a set of fingers 53N, the fingers 53W being disposed in their chambers 49L. Accordingly, until the torque imposed upon the sprocket ring by the spring fingers 53N is overcome by reverse web torque, said sprocket ring is frictionally drivable by a torque driving said hub. In FIG. 5, a set of the spring fingers 53W serve to frictionally bind said sprocket ring to the hub. Inasmuch as the spring fingers 53W are wider than the spring fingers 53N, a proportionately larger torque will be imposed on the sprocket ring under the conditions of FIG. 5 than under the conditions of FIG. 4.

From the foregoing, it is observed that a range of torque characteristics with which sprocket ring and hub are held in co-rotational association can be procured by employing selected sets of spring fingers associated with each hub. Moreover, spring finger tension can be varied by adjusting finger width or thickness at the time of hub fabrication.

As many substitutions or changes could be made in the above described construction, and as many apparently widely different embodiments of the invention within the scope of the claims could be constructed without departing from the scope and spirit thereof, it is intended that all matter contained in the accompanying specification shall be interpreted as being illustrative and not in a limiting sense.

The embodiments of the invention in which an exclusive property or privilege is claimed are defined as follows:

1. A reel construction adapted for take-up of a marginally notched web and comprising a rotationally drivable hub; a pair of flanges spaced apart axially of said hub and defining thereabout a web chamber; a sprocket ring mounted concentrically with said hub and adapted for co-rotation therewith, said sprocket ring having a plurality of circumferential drive teeth projecting into said web chamber for engagement in the marginal notches of a first convolution of a web coiled about said hub, and yieldable, elongated holding means integral with said hub at one end and extending from said hub with the free end in slippable frictional engagement with said sprocket ring, said holding means being comprised of a plurality of variably tensioned components arranged for selective application of different slippable hub clutching torque on said sprocket by selection of said holding means applied on said sprocket ring.

2. A reel construction as defined in claim 1 in which said holding means comprises differently proportioned sets of bendable gripper portions arranged for selective disposition outside of said hub for retention of said sprocket under different torque loads in slippable clutching engagement with said hub.

3. A reel construction as defined in claim 1 in which said hub is fashioned with side opening chamber means, said holding means comprising grippers of varying proportions having inner end portions disposed within said chamber means and free outer end portions selectively bendable from said chamber means for retention of said sprocket under variable torque loads in slippable frictional association with a side of said hub.

4. A reel construction as defined in claim 3 in which said grippers are uniformly annularly arranged about said hub in sets of like proportions, whereby the grippers of each set may be selectively engaged with said sprocket for application of annularly uniform hub clutching torque of variable magnitude.

References Cited
UNITED STATES PATENTS

| | | | |
|---|---|---|---|
| 1,861,891 | 6/1932 | Wittel | 242—74.2 |
| 3,298,625 | 1/1967 | Babcock | 242—74 X |
| 3,315,911 | 4/1967 | Bundschuh | 242—74 |
| 3,330,496 | 7/1967 | Tatter et al. | 242—74.2 |

FRANK J. COHEN, *Primary Examiner.*

N. L. MINTZ, *Assistant Examiner.*